US 9,810,960 B2

(12) United States Patent
Hao

(10) Patent No.: US 9,810,960 B2
(45) Date of Patent: Nov. 7, 2017

(54) LIQUID CRYSTAL DISPLAY PANEL AND ARRAY SUBSTRATE THEREOF

(71) Applicants:Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Sikun Hao, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 93 days.

(21) Appl. No.: 14/767,652

(22) PCT Filed: Jul. 10, 2015

(86) PCT No.: PCT/CN2015/083730
§ 371 (c)(1),
(2) Date: Aug. 13, 2015

(87) PCT Pub. No.: WO2016/206135
PCT Pub. Date: Dec. 29, 2016

(65) Prior Publication Data
US 2016/0377896 A1    Dec. 29, 2016

(30) Foreign Application Priority Data

Jun. 24, 2015 (CN) .......................... 2015 1 03554507

(51) Int. Cl.
*G02F 1/1362* (2006.01)
*G02F 1/1339* (2006.01)
*G02F 1/1343* (2006.01)

(52) U.S. Cl.
CPC .... *G02F 1/136209* (2013.01); *G02F 1/13394* (2013.01); *G02F 1/136227* (2013.01);
(Continued)

(58) Field of Classification Search
CPC ...................................................... G02F 1/1368
See application file for complete search history.

(56) References Cited

U.S. PATENT DOCUMENTS

| 7,295,268 B2 | 11/2007 | Ono et al. |
| 2005/0122442 A1 | 6/2005 | Park |

(Continued)

FOREIGN PATENT DOCUMENTS

| CN | 202735635 U | 2/2013 |
| CN | 103353683 A | 10/2013 |

*Primary Examiner* — Edmond Lau
(74) *Attorney, Agent, or Firm* — Andrew C. Cheng

(57) ABSTRACT

An array substrate includes a first glass substrate, a first metallic layer for forming a scan line and a gate of a TFT, a first insulating layer on the first metallic layer, a semiconductor layer on the first insulating layer, a second metallic layer disposed on the semiconductor layer for forming a source and a drain of the TFT and a data line, a color resist layer on the second metallic layer and the first insulting layer for forming a color filter, a pixel electrode on the color resist layer and connected to the drain of the TFT through a via hole on the color resist layer, a passivation layer on the electrode layer, and a black matrix layer on the passivation layer. The black matrix is disposed correspondingly to the color filter and the pixel electrode. Using such array substrate can reduce manufacturing processes and cost.

13 Claims, 2 Drawing Sheets

(52) U.S. Cl.
CPC ............ *G02F 2001/134372* (2013.01); *G02F 2001/136222* (2013.01); *G02F 2201/40* (2013.01)

(56) References Cited

U.S. PATENT DOCUMENTS

| | | |
|---|---|---|
| 2008/0074586 A1 | 3/2008 | Sakamoto et al. |
| 2014/0104527 A1* | 4/2014 | Yang .................. H01L 27/1225 349/43 |
| 2015/0153875 A1 | 6/2015 | Zhang |
| 2015/0309644 A1 | 10/2015 | Sun et al. |
| 2015/0370116 A1* | 12/2015 | Chae ................... G02F 1/13394 349/43 |
| 2016/0291377 A1* | 10/2016 | Kosuge ............... G02F 1/13439 |

* cited by examiner

LIQUID CRYSTAL DISPLAY PANEL AND ARRAY SUBSTRATE THEREOF

BACKGROUND OF THE INVENTION

1. Field of the Invention

The present invention relates to a liquid crystal display field, and more particularly, to a liquid crystal display panel and an array substrate thereof.

2. Description of the Related Art

With a rapid development of monitor types, novelty and colorful monitors with high resolution, e.g., liquid crystal displays (LCDs), are indispensable components used in various electronic products such as monitors for notebook computers, personal digital assistants (PDA), digital cameras, and projectors. The demand for high display quality, novelty design, and interactive user interface LCDs has increased tremendously. Touch panel displays having advantages of a friendly operation and compactness become more popular.

The current LCD comprises an upper substrate, a bottom substrate and a liquid crystal layer therebetween. Either the upper substrate or the bottom substrate is formed by a glass substrates and electrodes thereon. In the case of both the upper substrate and the bottom substrate having electrodes such as a Twist Nematic (TN) type LCD, a Vertical Alignment (VA) type LCD, and a Multi-domain Vertical Alignment (MVA) type LCD with a wide viewing angle, a longitudinal electric field across the electrodes of the upper substrate and the bottom substrate can drive liquid crystals of the liquid crystal layer. In another case of electrodes only on one of the upper and the bottom substrates such as an In-plane switching (IPS) type LCD and a Fringe Field Switching (FFS) type LCD, a horizontal electric field across the electrodes on the upper substrate or the bottom substrate can drive liquid crystal molecules of the liquid crystal layer. However, manufacturing such conventional LCD needs complex processes and high cost.

SUMMARY OF THE INVENTION

An objective of the present invention is to provide an LCD panel and an array substrate thereof capable of reducing manufacturing processes and cost.

According to the present invention, an array substrate comprises a first glass substrate, a first metallic layer, a first insulating layer, a semiconductor layer, a second metallic layer, a color resist layer, a pixel electrode, a passivation layer, a black matrix layer, a common electrode and a spacer. The first metallic layer, disposed on the first glass substrate, is used for forming a scan line and a gate of a thin film field effect transistor. The first insulating layer is disposed on the first metallic layer. The semiconductor layer, disposed on the first insulating layer, is used for forming a channel of the thin film field effect transistor. The second metallic layer, disposed on the semiconductor layer, is used for forming a source and a drain of the thin film field effect transistor and forming a data line. The color resist layer, disposed on the second metallic layer and the first insulting layer, is used for forming a color filter. The pixel electrode, disposed on the color resist layer and connected to the drain of the thin film field effect transistor through a via hole penetrating the color resist layer, is used for forming a pixel electrode. The passivation layer is disposed on the electrode layer. The black matrix layer, disposed on the passivation layer, is used for forming a black matrix. The black matrix is disposed correspondingly to the color filter and the pixel electrode.

The common electrode, disposed on the passivation layer and the black matrix layer, is used for forming a common electrode. A spacer, disposed on the common electrode layer above the black matrix layer, is used for retaining a cell gap. The black matrix is disposed correspondingly to the color filter and the pixel electrode.

Furthermore, the common electrode covers the black matrix layer.

Furthermore, the black matrix layer is made from metal or alloy with low reflectivity.

According to the present invention, an array substrate comprises a first glass substrate, a first metallic layer, a first insulating layer, a semiconductor layer, a second metallic layer, a color resist layer, a pixel electrode, a passivation layer, and a black matrix layer. The first metallic layer, disposed on the first glass substrate, is used for forming a scan line and a gate of a thin film field effect transistor. The first insulating layer is disposed on the first metallic layer. The semiconductor layer, disposed on the first insulating layer, is used for forming a channel of the thin film field effect transistor. The second metallic layer, disposed on the semiconductor layer, is used for forming a source and a drain of the thin film field effect transistor and forming a data line. The color resist layer, disposed on the second metallic layer and the first insulting layer, is used for forming a color filter. The pixel electrode, disposed on the color resist layer and connected to the drain of the thin film field effect transistor through a via hole penetrating the color resist layer, is used for forming a pixel electrode. The passivation layer is disposed on the electrode layer. The black matrix layer, disposed on the passivation layer, is used for forming a black matrix. The black matrix is disposed correspondingly to the color filter and the pixel electrode.

Furthermore, the array substrate further comprises a common electrode, disposed on the passivation layer and the black matrix layer, for forming a common electrode.

Furthermore, the common electrode covers the black matrix layer.

Furthermore, the black matrix layer is made from metal or alloy with low reflectivity.

Furthermore, the array substrate further comprises a spacer, disposed on the common electrode layer above the black matrix layer, for retaining a cell gap.

According to the present invention, a liquid crystal display panel comprises an array substrate, a second glass substrate and a liquid crystal layer between the array substrate and the second glass substrate. The array substrate comprises a first glass substrate, a first metallic layer, a first insulating layer, a semiconductor layer, a second metallic layer, a color resist layer, a pixel electrode, a passivation layer, and a black matrix layer. The first metallic layer, disposed on the first glass substrate, is used for forming a scan line and a gate of a thin film field effect transistor. The first insulating layer is disposed on the first metallic layer. The semiconductor layer, disposed on the first insulating layer, is used for forming a channel of the thin film field effect transistor. The second metallic layer, disposed on the semiconductor layer, is used for forming a source and a drain of the thin film field effect transistor and forming a data line. The color resist layer, disposed on the second metallic layer and the first insulting layer, is used for forming a color filter. The pixel electrode, disposed on the color resist layer and connected to the drain of the thin film field effect transistor through a via hole penetrating the color resist layer, is used for forming a pixel electrode. The passivation layer is disposed on the electrode layer. The black matrix layer, disposed on the passivation layer, is used for forming a black matrix. The black matrix is disposed correspondingly to the color filter and the pixel electrode.

Furthermore, the array substrate further comprises a common electrode, disposed on the passivation layer and the black matrix layer, for forming a common electrode.

Furthermore, the common electrode covers the black matrix layer.

Furthermore, the black matrix layer is made from metal or alloy with low reflectivity.

Furthermore, the array substrate further comprises a spacer, disposed on the common electrode layer above the black matrix layer, for retaining a cell gap. In contrast to prior art, the present invention proposes an array substrate of an LCD panel comprising, a first metallic layer, a first insulating layer, a semiconductor layer, a second metallic layer, a color resist layer, a pixel electrode layer, a passivation layer, and a black matrix layer disposed on the first glass substrate in order. By using such array substrate, an alignment of the color resist layer, the black matrix layer and the pixel electrode layer is more precise, thereby reducing manufacturing processes and cost.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention. The accompanying drawings are included to provide a further understanding of the invention, and are incorporated in and constitute a part of this specification. The drawings illustrate embodiments of the invention and, together with the description, serve to explain the principles of the invention.

Figure 1:
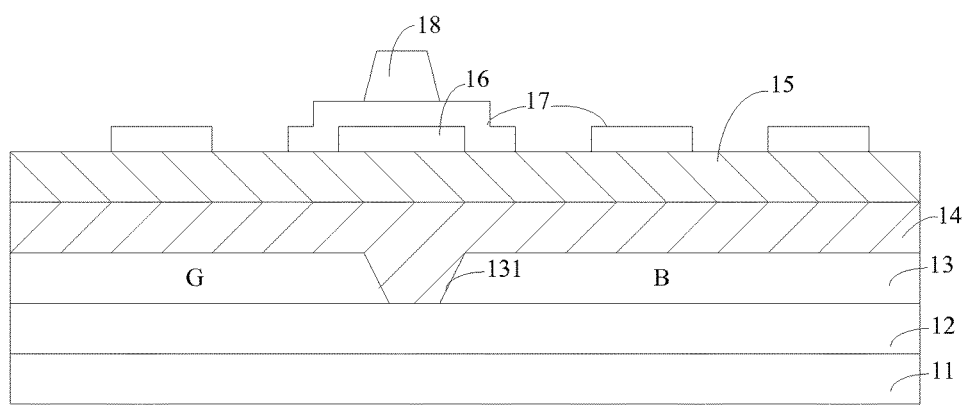
FIG. 1 shows a schematic diagram of an array substrate according to a preferred embodiment of the present invention.

Please refer to FIG. 1 showing a schematic diagram of an array substrate according to a preferred embodiment of the present invention. The array substrate 10 comprises a first glass substrate 11, a thin film field effect transistor 12 (referred to as TFT in FIG. 3), a color resist layer 13 (referred to as R/G/B in FIG. 3), a pixel electrode layer 14 (referred to as Pixel ITO in FIG. 3), a passivation layer 15 (referred to as PV in FIG. 3), a black matrix 16 (referred to as BM in FIG. 3), a common electrode 17 (referred to as TITO in FIG. 3), and a spacer 18 (referred to as PS in FIG. 3).

Figure 2:
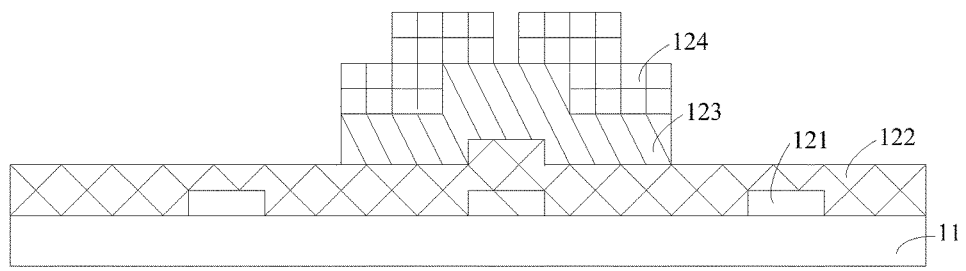
FIG. 2 shows a schematic diagram of the thin film field effect transistor shown in FIG. 1.

The thin film field effect transistor 12 is disposed on the first glass substrate 11, as suggested in FIG. 2. The thin film field effect transistor 12 comprises a first metallic layer 121, a first insulting layer 122, a semiconductor layer 123 and a second metallic layer 124. The first metallic layer 121, preferably made from Chromium (Cr), Molybdenum (Mo), Aluminum (Al) or Copper (Cu), is disposed on the first glass substrate 11 and is used for forming a scan line and a gate of the thin film field effect transistor 12. The first insulating layer 122, preferably made from Silicon Nitride (SiNx), is disposed on the first metallic layer 121. The semiconductor layer 123, preferably made from Amorphous silicon, is disposed on the first insulting layer 122 and is used for forming a channel of the thin film field effect transistor 12. The second metallic layer 124, preferably made from Chromium (Cr), Molybdenum (Mo), Aluminum (Al) or Copper (Cu), is disposed on the semiconductor layer 123 and is used for forming a source and a drain of the thin film field effect transistor 12 and a data line.

The color resist layer 13 is disposed on the second metallic layer 124 and the first insulating layer 122, and is used for forming a color filter. Preferably, the color resist layer 13 comprises a red (R) color resist, a green (G) color resist and a blue (B) color resist. A via hole 131 is defined between two adjacent color resists of the color resist layer 13. In another embodiment, the color resist layer 13 comprises a red (R) color resist, a green (G) color resist, a blue (B) color resist, and a white (W) color resist. The pixel electrode layer 14 is disposed on the color resist layer 13 and is connected to the drain of the thin film field effect transistor 12 through the via hole 131 penetrating the color resist layer 13, and is used for forming a pixel electrode. Preferably, the pixel electrode layer 14 is made from Indium Tin Oxide (ITO) or Indium Zinc Oxide (IZO). A capacitance coupling between the pixel electrode layer 14 and the thin film field effect transistor 12 is diminished due to an insulation of the color resist layer.

The passivation layer 15 is disposed on the pixel electrode layer 14. The black matrix layer 16 is disposed on the passivation layer 15 and is used for forming a black matrix. That is, the black matrix is exactly disposed above the via hole 131. Since the color resist layer 13 and the black matrix layer 16 are disposed on the first glass substrate 11, an aperture ratio of a pixel increases and light transmittance and contrast ratio of the pixel are thus increase. Because the black matrix is disposed corresponding to the color filter and the pixel electrode, an alignment of the color resist layer 13, the black matrix layer 16 and the pixel electrode layer 14 is more precise, thereby reducing an overlap of the black matrix layer 16 and the pixel electrode, and greatly increasing an aperture of the pixel.

The common electrode layer 17, disposed on the passivation layer 15 and the black matrix layer 16, is used for forming common electrodes. The common electrode layer 17, the passivation layer 15 and the pixel electrode layer 14 constitute a Fringe Field Switching (FFS) pixel electrode structure. The common electrode covers the black matrix layer 16. For blocking light, the black matrix layer 16 is preferably made from a metal or an alloy with low reflectivity.

In the case of a touch panel integrated with the array substrate 10, the black matrix layer 16 serves as an external connecting line for transmitting sensing signal in response to a touch on the touch panel during scanning the touch panel.

In another aspect, the black matrix layer 16 connects the common electrode when the liquid crystals are driven.

The spacer 18 for retaining a cell gap is disposed on the common electrode and aims the black matrix, i.e. the spacer 18 is disposed on the common electrode layer 17 covering the black matrix layer 16.

Figure 3:
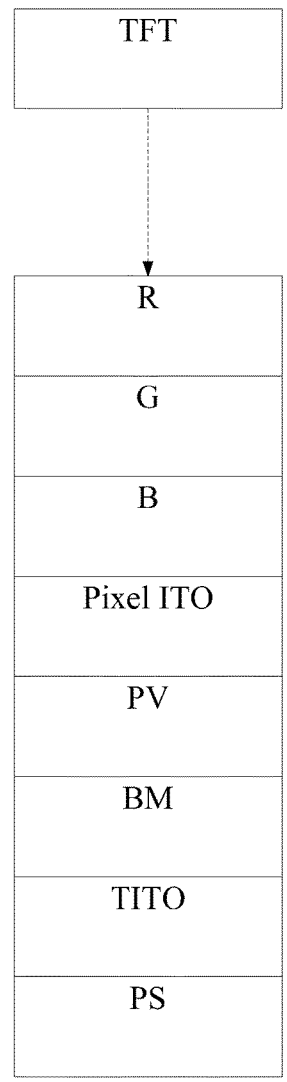
FIG. 3 shows a diagram of forming the array substrate shown in FIG. 1.

Referring to FIG. 3 showing a diagram of forming the array substrate 10, the processes of forming the array substrate 10 comprises in order: a thin film field effect transistor 12 (referred to as TFT in FIG. 3), a color resist layer 13 (referred to as R/G/B in FIG. 3), a pixel electrode layer 14 (referred to as Pixel ITO in FIG. 3), a passivation layer 15 (referred to as PV in FIG. 3), a black matrix 16 (referred to as BM in FIG. 3), a common electrode 17 (referred to as TITO in FIG. 3), and a spacer 18 (referred to as PS in FIG. 3). Various thin film field effect transistors 12 adopts different manufacturing processes.

According to the present embodiment, the array substrate 10 comprises the first metallic layer 122, the first insulating layer 122, the semiconductor layer 123, the second metallic layer 124, the color resist layer 13, the pixel electrode layer 14, the passivation layer 15 and the black matrix layer 16 disposed on the first glass substrate 11 in order. By using such array substrate 10, an alignment of the color resist layer 13, the black matrix layer 16 and the pixel electrode layer 14 is more precise, thereby reducing manufacturing processes and cost.

Figure 4:
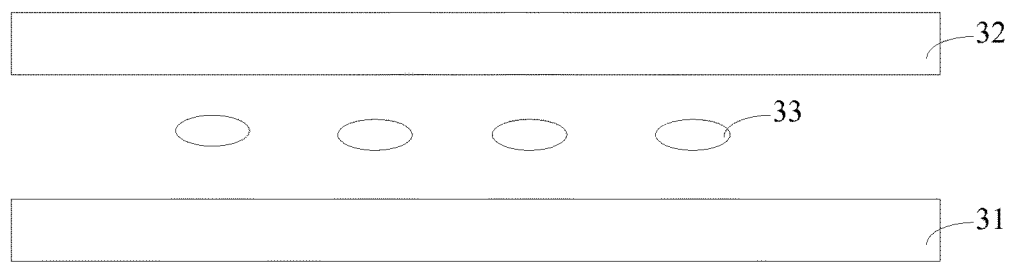
FIG. 4 shows a liquid crystal display panel according to a second embodiment of the present invention.

The present invention also proposes a liquid crystal display panel 30 having an array substrate 31, a second glass substrate 32, and a liquid crystal layer 33 sandwiched between the array substrate 31 and the second glass substrate 32, as suggested in FIG. 4. The array substrate 31 is analogous with the array substrate 10 as disclosed in the preceding embodiment.

Briefly summarized, the present invention proposes an array substrate of an LCD panel comprising, a first metallic layer, a first insulating layer, a semiconductor layer, a second metallic layer, a color resist layer, a pixel electrode layer, a passivation layer, and a black matrix layer disposed on the first glass substrate in order. By using such array substrate, an alignment of the color resist layer, the black matrix layer and the pixel electrode layer is more precise, thereby reducing manufacturing processes and cost.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. An array substrate comprising:
    a first glass substrate;
    a first metallic layer, disposed on the first glass substrate, for forming a scan line and a gate of a thin film field effect transistor;
    a first insulating layer, disposed on the first metallic layer;
    a semiconductor layer, disposed on the first insulating layer, for forming a channel of the thin film field effect transistor;
    a second metallic layer, disposed on the semiconductor layer, for forming a source and a drain of the thin film field effect transistor and forming a data line;
    a color resist layer, disposed on the second metallic layer and the first insulting layer, for forming a color filter;
    a pixel electrode layer, disposed on the color resist layer and connected to the drain of the thin film field effect transistor through a via hole penetrating the color resist layer, for forming a pixel electrode;
    a passivation layer, disposed on the pixel electrode layer;
    a black matrix layer, disposed on the passivation layer, for forming a black matrix;
    a common electrode, disposed on the passivation layer and the black matrix layer, for forming a common electrode; and
    a spacer, disposed on the common electrode layer above the black matrix, for retaining a cell gap;
    wherein the via hole is defined between two adjacent color resists of the color resist layer, and the black matrix is disposed corresponding to the color filter and the pixel electrode so that the black matrix is exactly disposed above the via hole.

2. The array substrate of claim 1, wherein the common electrode covers the black matrix layer.

3. The array substrate of claim 2, wherein the black matrix layer is made from metal or alloy with low reflectivity.

4. An array substrate comprising:
    a first glass substrate;
    a first metallic layer, disposed on the first glass substrate, for forming a scan line and a gate of a thin film field effect transistor;
    a first insulating layer, disposed on the first metallic layer;
    a semiconductor layer, disposed on the first insulating layer, for forming a channel of the thin film field effect transistor;
    a second metallic layer, disposed on the semiconductor layer, for forming a source and a drain of the thin film field effect transistor and forming a data line;
    a color resist layer, disposed on the second metallic layer and the first insulting layer, for forming a color filter;
    a pixel electrode layer, disposed on the color resist layer and connected to the drain of the thin film field effect transistor through a via hole penetrating the color resist layer, for forming a pixel electrode;
    a passivation layer, disposed on the pixel electrode layer; and
    a black matrix layer, disposed on the passivation layer, for forming a black matrix;
    wherein the via hole is defined between two adjacent color resists of the color resist layer, and the black matrix is disposed corresponding to the color filter and the pixel electrode so that the black matrix is exactly disposed above the via hole.

5. The array substrate of claim 4, further comprising a common electrode, disposed on the passivation layer and the black matrix layer, for forming a common electrode.

6. The array substrate of claim 5, wherein the common electrode covers the black matrix layer.

7. The array substrate of claim 4, wherein the black matrix layer is made from metal or alloy with low reflectivity.

8. The array substrate of claim 7, further comprising a spacer, disposed on the common electrode layer above the black matrix, for retaining a cell gap.

9. A liquid crystal display panel comprising an array substrate, a second glass substrate and a liquid crystal layer between the array substrate and the second glass substrate, the array substrate comprising:
    a first glass substrate;
    a first metallic layer, disposed on the first glass substrate, for forming a scan line and a gate of a thin film field effect transistor;
    a first insulating layer, disposed on the first metallic layer;

a semiconductor layer, disposed on the first insulating layer, for forming a channel of the thin film field effect transistor;

a second metallic layer, disposed on the semiconductor layer, for forming a source and a drain of the thin film field effect transistor and forming a data line;

a color resist layer, disposed on the second metallic layer and the first insulting layer, for forming a color filter;

a pixel electrode layer, disposed on the color resist layer and connected to the drain of the thin film field effect transistor through a via hole penetrating the color resist layer, for forming a pixel electrode;

a passivation layer, disposed on the pixel electrode layer; and a black matrix layer, disposed on the passivation layer, for forming a black matrix;

wherein the via hole is defined between two adjacent color resists of the color resist layer, and the black matrix is disposed corresponding to the color filter and the pixel electrode so that the black matrix is exactly disposed above the via hole.

10. The liquid crystal display panel of claim 9, wherein the array substrate further comprises a common electrode, disposed on the passivation layer and the black matrix layer, for forming a common electrode.

11. The liquid crystal display panel of claim 10, wherein the common electrode covers the black matrix layer.

12. The liquid crystal display panel of claim 9, wherein the black matrix layer is made from metal or alloy with low reflectivity.

13. The liquid crystal display panel of claim 12, wherein the array substrate further comprises a spacer, disposed on the common electrode layer above the black matrix, for retaining a cell gap.

* * * * *